(12) United States Patent
Usui et al.

(10) Patent No.: US 12,346,293 B2
(45) Date of Patent: Jul. 1, 2025

(54) IMAGE PROCESSING APPARATUS CAPABLE OF EFFICIENTLY CONVERTING IMAGE FILE, CONTROL METHOD THEREFOR, AND STORAGE MEDIUM

(71) Applicant: CANON KABUSHIKI KAISHA, Tokyo (JP)

(72) Inventors: Yuta Usui, Tokyo (JP); Noboru Omori, Kanagawa (JP); Yuma Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 18/320,306

(22) Filed: May 19, 2023

(65) Prior Publication Data

US 2023/0385245 A1 Nov. 30, 2023

(30) Foreign Application Priority Data

May 27, 2022 (JP) ................. 2022-086766

(51) Int. Cl.
*G06F 16/178* (2019.01)
(52) U.S. Cl.
CPC ............... *G06F 16/1794* (2019.01)
(58) Field of Classification Search
CPC .................................. G06F 16/1794
See application file for complete search history.

(56) References Cited

U.S. PATENT DOCUMENTS

| 11,011,202 | B2 | 5/2021 | Omori | |
|---|---|---|---|---|
| 2006/0152609 | A1* | 7/2006 | Prentice | G06T 1/0007 348/272 |
| 2020/0218705 | A1* | 7/2020 | Pidduck | G06F 11/302 |
| 2023/0342387 | A1* | 10/2023 | Funamoto | H04N 5/772 |

FOREIGN PATENT DOCUMENTS

JP 2020-091702 A 6/2020

* cited by examiner

*Primary Examiner* — Tony Wu
(74) *Attorney, Agent, or Firm* — Venable LLP

(57) ABSTRACT

An image processing apparatus which efficiently converts an image file. The image processing apparatus, based on an instruction, converts a first-format image file including image data and annotation information into a second-format image file having memory capacity of a predetermined area smaller than that of the first-format image file. The image processing apparatus records annotation information into the first-format image file, and generates, based on said annotation information, annotation information for the second-format image file having a size suit for the predetermined area, and before receiving the instruction being received, records the annotation information for the second-format image file into the first-format image file, and records the annotation information for the second-format image file recorded in the first-format image file, into the predetermined area in the second-format image file.

9 Claims, 11 Drawing Sheets

IMAGE PROCESSING APPARATUS CAPABLE OF EFFICIENTLY CONVERTING IMAGE FILE, CONTROL METHOD THEREFOR, AND STORAGE MEDIUM

BACKGROUND OF THE INVENTION

Field of the Invention

The present invention relates to an image processing apparatus that is capable of efficiently converting an image file, a control method therefor, and a storage medium.

Description of the Related Art

Lately, AI (Artificial Intelligence) technologies such as deep learning have been used in various technical fields. For example, for digital cameras having the function of detecting human faces from image data obtained by shooting, a technique for accurately detecting, using an inference model, targets other than people, such as animals, plants, buildings, and objects has been proposed (see, for example, Japanese Laid-Open Patent Publication (Kokai) No. 2020-91702). A technique for recording information on detected targets as annotation information in association with image data has also been proposed. Specifically, an image file in which image data and annotation information are recorded is generated. For example, recording, as annotation information, information indicating the area of a detected target by a point, a rectangle, a circle, or the like is being contemplated. Cutting out image data of a detected target as related image data of original image data and recording the cut-out image data in association with the original image data is also being contemplated. In addition, recording the properties such as color, shape and type, of the cut-out image data in association with the original image data is being contemplated.

On the other hand, digital cameras are equipped with the function of converting a RAW image file or an HEIF (High Efficiency Image File Format) image file to a JPEG image file that has higher reproduction compatibility.

A JPEG image file has a small memory capacity of an area where annotation information is recorded as compared to image files in other formats such as HEIF. For this reason, in a case where a RAW image file or an HEIF image file is converted to a JPEG image file, annotation information recorded in a pre-conversion image file cannot be recorded as it is in the JPEG image file. Namely, according to the prior art, an image file cannot be efficiently converted.

SUMMARY OF THE INVENTION

The present invention provides an image processing apparatus capable of efficiently converting an image file, a control method therefor, and a storage medium.

Accordingly, the present invention provides an image processing apparatus comprising at least one memory that stores a set of instructions, and at least one processor that is configured to execute the instructions, the instructions, when being executed, causing the image processing apparatus to: in accordance with an image conversion instruction issued by a user, convert a first-format image file in a first format including image data and annotation information on the image data into a second-format image file in a second format whose memory capacity of a predetermined area where annotation information is recorded is smaller than that of the first-format image file; and when recording the first-format image file, record annotation information into the first-format image file, and generate, based on the said annotation information, annotation information for the second-format image file, which fits in a size that can be recorded in the predetermined area, and record the generated annotation information for the second-format image file into the first-format image file, wherein the at least one processor executes the instructions causing the image processing apparatus to before the image processing apparatus receives the image conversion instruction, record the annotation information for the second-format image file into the first-format image file, and record the annotation information for the second-format image file, which is recorded in the first-format image file, into the predetermined area in the second-format image file.

According to the present invention, an image file is efficiently converted.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof. It should be noted that the embodiment described below does not limit the claimed invention. The embodiment described below has a plurality of features, but all of the features should not always be essential for the invention, and the features can be arbitrarily combined together. Moreover, in the accompanying drawings, the same or equivalent features are designated by the same reference symbols, and duplicate descriptions thereof are omitted.

In the following description, a digital camera that classifies subjects using an inference model is taken as an example of an image processing apparatus according to the present embodiment, but the image processing apparatus is not limited to the digital camera. For example, the image processing apparatus has only to be an apparatus such as a smartphone or a tablet PC that converts an image file such as an HEIF file stored in a storage unit into an image file in another format.

Moreover, in the present embodiment described below, an HEIF image file as a first-format image file is converted to a JPEG image file as a second-format image file, but the present invention is not limited to this. The first-format image file has only to have a configuration in which it includes image data and annotation information on the said image data, and the storage capacity of a predetermined area where the annotation information is stored is larger than that of the image file in the second file format, and may be an image file in another format other than HEIF. The second-format image file has only to have a configuration in which the storage capacity of a predetermined area where the annotation information is stored is smaller than that of the first-file image file, and may be an image file in another format other than JPEG.

Figure 1:
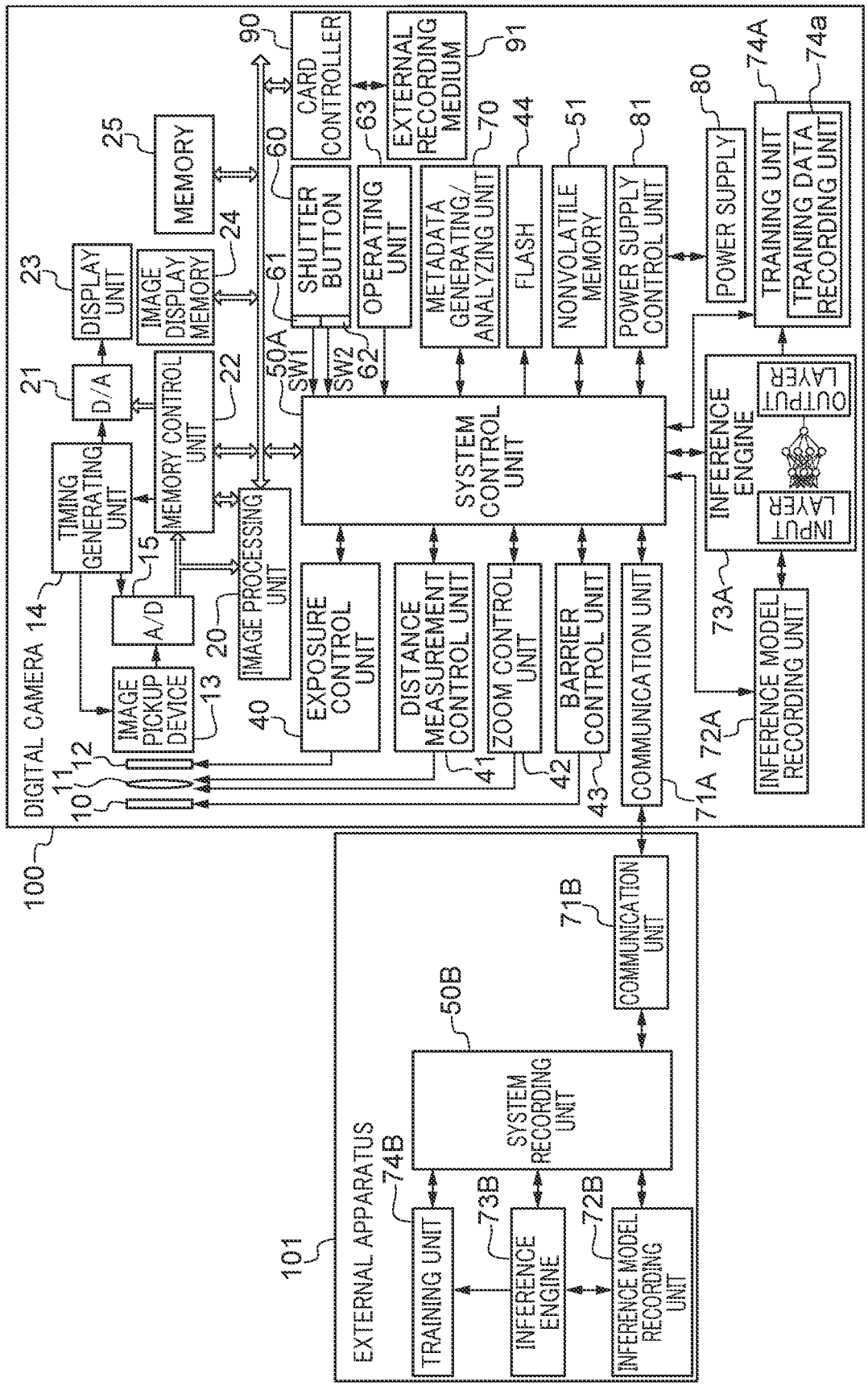
FIG. 1 is a block diagram showing an example of the configuration of a digital camera as an image processing apparatus according to an embodiment of the present invention.

FIG. 1 is a block diagram showing an example of the configuration of the digital camera 100 which is the image processing apparatus according to the present embodiment.

A barrier 10 is a protective member that covers an image pickup unit including a taking lens 11 of the digital camera 100 to protect the image pickup unit from dust and scratches. The taking lens 11 forms an optical image on an imaging surface of an image pickup device 13. A shutter 12 has a diaphragm function. The image pickup device 13 converts an optical image formed on the imaging surface to an electric signal. The image pickup device 13 is comprised of, for example, a CCD or CMOS device. An A/D converter 15 (A/D 15) converts analog signals output from the image pickup device 13 to digital signals. The digital signals obtained through the conversion by the A/D converter 15 are written as so-called RAW image data into a memory 25. Development parameters for the respective pieces of the RAW image data are generated based on information obtained during shooting, and the development parameters as well as the RAW image data are written into the memory 25. The development parameters include parameters for use in exposure control and parameters for use in image processing such as white balance, color space, and contrast.

A timing generating unit 14 supplies clock signals and control signals to the image pickup device 13, the A/D converter 15, and a D/A converter 21 (D/A 21). The timing generating unit 14 is controlled by a memory control unit 22 and a system control unit 50A. An image processing unit 20 performs various types of image processing such as predetermined image interpolation, color conversion, correction, and resizing on data output from the A/D converter 15 or on data output from the memory control unit 22. The image processing unit 20 also performs predetermined image processing and arithmetic processing using captured image data and provides the system control unit 50A with obtained calculation results. The system control unit 50A controls, based on the provided calculation results, an exposure control unit 40 and a distance measurement control unit 41 to implement AF (Auto Focus) processing, AE (Auto Exposure) processing, and EF (pre-flashing) processing.

It should be noted that the image processing unit 20 performs predetermined arithmetic processing using captured image data, and performs AWB (Auto White Balance) processing based on an obtained calculation result. The image processing unit 20 also compresses image data stored in the memory using methods such as JPEG, MPEG-4 AVC, or HEVC (High Efficiency Video Coding). The image processing unit 20 also decompresses data that has been compressed using those methods. The image processing unit 20 writes the processed data into the memory 25.

The image processing unit 20 also performs predetermined arithmetic processing using captured image data and edits various types of image data. Specifically, the image processing unit 20 carries out a trimming process which adjusts the size and display area of an image by hiding an unnecessary part at the edge of image data and a resizing process which changes the size of image data, screen display element, or the like by enlarging and/or reducing them. The image processing unit 20 also performs, on the compressed or decompressed data, RAW development which performs image processing such as color conversion and then performs conversion to JPEG image data. The image processing unit 20 also carries out a process which cuts out a designated frame in such a video format as MPEG-4 and converts it to JPEG data.

The image processing unit 20 also carries out, for example, a process which when displaying OSD (On-Screen Display) such as menus and/or arbitrary characters on the display unit 23 together with image data, superimposes them.

The image processing unit 20 also carries out a process which detects a subject area in image data using input image data and/or information on the distance to a subject obtained from the image pickup device 13 or the like during shooting. By this process, the position, size, etc. of the subject in the image data are obtained.

The memory control unit 22 controls the A/D converter 15, the timing generating unit 14, the image processing unit 20, an image display memory 24, the D/A converter 21, and the memory 25. RAW image data generated through the A/D converter 15 is written into the image display memory 24 and/or the memory 25 via the image processing unit 20 and the memory control unit 22, or via only the memory control unit 22 without via the image processing unit 20.

Image data to be displayed written into the image display memory 24 is displayed on the display unit 23 via the D/A converter 21. An electronic finder function of displaying live images is implemented by captured image data being successively displayed on the display unit 23. The memory 25 stores still image data and video data that have been shot. The memory 25 has a storage capacity enough to store a predetermined number of still image data and/or predetermined hours of video data. The memory 25 is also used as a work area for the system control unit 50A.

The exposure control unit 40 controls the shutter 12 having the diaphragm function. The exposure control unit 40 also implements a flash light modulation function by operating in conjunction with a flash 44. The distance measurement control unit 41 controls the focusing of the taking lens 11. A zoom control unit 42 controls the zooming of the taking lens 11. A barrier control unit 43 controls the operation of the barrier 10 which is the protective member. The flash 44 has an AF assist light projecting function and a flash light modulation function.

The system control unit 50A controls the entire digital camera 100. A nonvolatile memory 51 is capable of electrically erasing and recording data. For example, an EEPROM is used as the nonvolatile memory 51. It should be noted that map information or the like as well as programs is recorded on the nonvolatile memory 51.

When the shutter button 60 is pressed halfway down, a shutter switch 61 (SW1) is turned on to issue an instruction to start AF processing, AE processing, AWB processing, EF processing or the like. When the shutter button 60 is pressed all the way down, a shutter switch 62 (SW2) is turned on to issue an instruction to start a sequence of shooting operations including an exposure process, a development process, and a recording process. In the exposure process, a signal read out from the image pickup device 13 is written as RAW data into the memory 25 via the A/D converter 15 and the memory control unit 22. In the development process, the RAW data written into the memory 25 is developed using the results of calculation by the image processing unit 20 and the memory control unit 22 and written as image data into the memory 25. In the recording process, the image data is read out from the memory 25 and compressed by the image processing unit 20 and stored in the memory 25. And then, the compressed image data is written into an external recording medium 91 via a card controller 90.

An operating unit 63 is equipped with various types of buttons, a touch panel, and so forth. For example, the operating unit 63 includes a power button, a menu button, a mode changing switch for changing a shooting mode among a shooting mode/a playback mode/other special shooting modes, and a cross key, a set button, a macro button, and a multi-screen reproducing page-break button. The operating unit 63 also includes, for example, a flash setting button, a single shooting/continuous shooting/self-timer selection button, a menu move plus (+) button, a menu move minus (−) button, a shooting image quality selection button, an exposure compensation button, a date/time setting button, and so forth.

A metadata generating/analyzing unit 70, when recording image data in the external recording medium 91, generates metadata conforming to the Exif (Exchangeable image file format) standard or the like for image data based on information obtained during shooting. The metadata includes, for example, information on settings in shooting, information on the image data, and characteristic information on a subject included in the image data. The metadata generating/analyzing unit 70 analyzes metadata added to image data loaded from the external recording medium 91. The metadata generating/analyzing unit 70 is also capable of generating metadata for respective frames and adding to the metadata of all the frames to video data, when recording image data.

A power supply 80 is comprised of a primary battery such as an alkali battery or a lithium battery, a secondary battery such as a NiCd battery, a NiMH battery, or a Li battery, an AC adapter, and so forth. The power supply control unit 81 supplies power supplied from the power supply 80 to each component of the digital camera 100. The card controller 90 sends and receives data to and from the external recording medium 91 such as a memory card. The external recording medium 91 is comprised of, for example, a memory card and records image data (still image data, video data) shot by the digital camera 100.

An inference model recording unit 72A stores an inference model obtained from an external apparatus 101 or the like by a communication unit 71A. An inference engine 73A inputs an image file, which includes image data and annotation information on the said image data and is obtained from the system control unit 50A, to the inference model stored in the inference model recording unit 72A and performs inference. It should be noted that in the present embodiment, the inference engine 73A can use an inference model obtained from the external apparatus 101 or the like by the communication unit 71A and recorded in the inference model recording unit 72A or use an inference model obtained by a training unit 74A retraining.

The inference model is comprised of an input layer, an intermediate layer (neurons), and an output layer. An image file output from the system control unit 50A is input to the input layer. The intermediate layer is comprised of a plurality of layers. The number of layers in the intermediate layer is determined appropriately for design, and the number of neurons in each layer is also determined appropriately for design. The output layer outputs annotation information for the image file input to the input layer.

In the present embodiment, it is assumed that the inference model used by the inference engine 73A is an inference model that infers the classification of a subject area detected from image data. This inference model is generated in the external apparatus 101 or the like by deep learning using, as training data, image data on various subjects and its classification result (e.g., the classification of animals such as dogs and cats and the classification of subjects such as humans, animals, plants, and buildings). It should be noted that the digital camera 100 can obtain another inference model other than the above inference model from the external apparatus 101 or the like and use the obtained another inference model.

The training unit 74A retrains the inference model stored in the inference model recording unit 72A (namely, updates the inference model) in accordance with an instruction from the system control unit 50A. The training unit 74A has a training data recording unit 74a. The training data recording unit 74a records information on training data for use in retraining the inference model. The training unit 74A retrains the inference model using the training data recorded in the training data recording unit 74a and stores the retrained inference model in the inference model recording unit 72A. As a result, the inference engine 73A can perform inference using the retrained inference model. It should be noted that in the present embodiment, a management version for managing the update status of the inference model can be held in the inference model recording unit 72A, making it possible to know the update status of the inference model based on the management version.

The communication unit 71A has a communication circuit for sending and receiving data. Communication by the communication unit 71A can be either wireless communication using Wi-Fi (registered trademark), Bluetooth (registered trademark) or the like, or wired communication using Ethernet, USB, or the like. For example, the communication unit 71A is capable of communicating with a communication unit 71B of the external apparatus 101. The communication unit 71A functions as a communication unit that sends and receives various types of information such as inference models and training data as well as image files to which annotation information created by the inference engine 73A is added. It should be noted that based on whether or not the external apparatus 101 is a camera-related apparatus, the digital camera 100 can place a limit on information to be sent.

The external apparatus 101 has a training unit 74B, an inference engine 73B, an inference model recording unit 72B, a system recording unit 50B, and the communication unit 71B. The training unit 74B creates an inference model in accordance with an instruction received from the system recording unit 50B or the like. The inference model recording unit 72B records an inference model sent from the digital camera 100 and an inference model created by the training unit 74B.

In the present embodiment, the digital camera 100 detects a target such as a person, an animal, a plant, a building, or an object from image data obtained by shooting. The digital camera 100 then generates an image file including the image data obtained by shooting and annotation information on the said image data. The digital camera 100 records, for example, information indicating the area of the detected target by a point, a rectangle, a circle, or the like as the annotation information, in the image file. The digital camera 100 also cuts out the image data of the detected target as image data (related image data) related to original image data and records the cut-out image data (related image data) in the image file. The digital camera 100 also records, in the image file, the properties of the cut-out image data such as color, shape, and type. In the present embodiment, for example, when receiving an instruction to shoot HEIF image data from a user, the digital camera 100 generates an HEIF image file 200 shown in FIG. 2A.

Figure 2A:
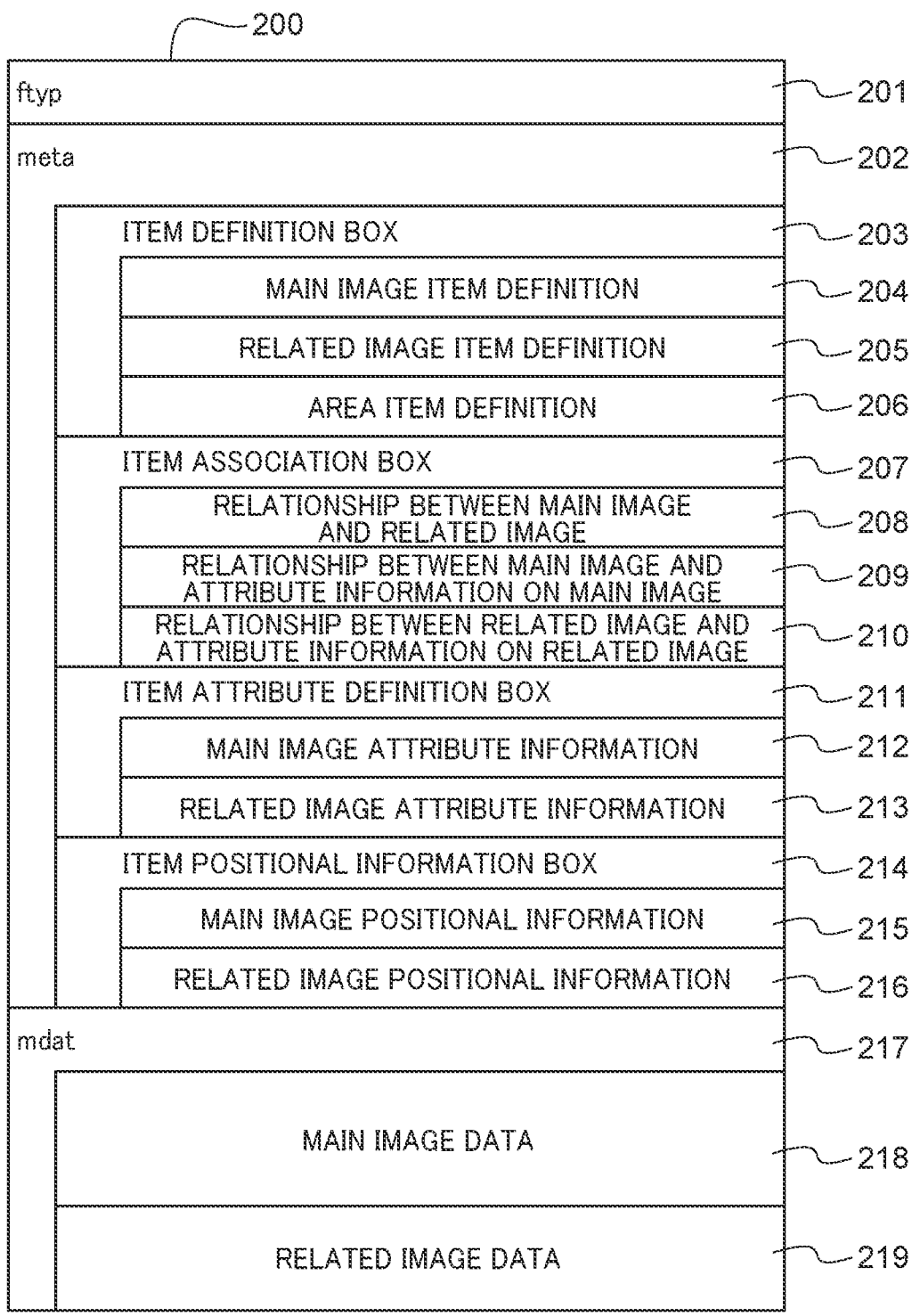
FIGS. 2A to 2D are views useful in explaining the configuration of an HEIF image file that is used in the embodiment of the present invention.
Figure 2B:
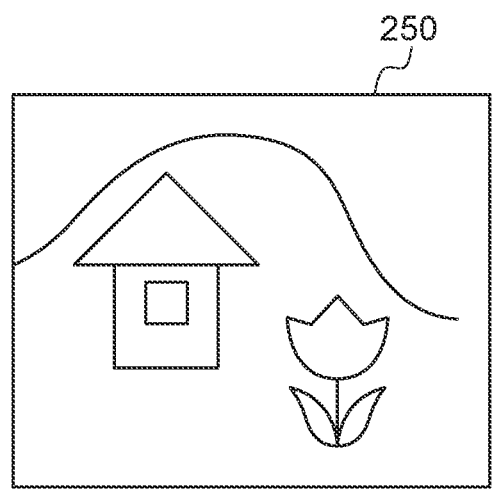
Figure 2C:
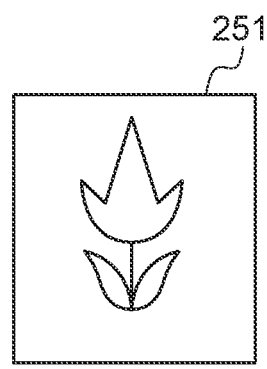

FIGS. 2A to 2D are views useful in explaining the configuration of the HEIF image file 200 that is used in the embodiment of the present invention. As shown in FIG. 2A, the HEIF image file 200 is comprised of a plurality of areas each called as "box" and records data in a tree structure. Data can be directly recorded in the boxes, or in a certain box, other boxes can be recorded as child elements. The HEIF image file 200 has an ftype box 201 in which the type of an image file is recorded, a meta box 202 in which metadata including annotation information and others is recorded, and an mdat box 217 in which image data is recorded. It should be noted that FIG. 2A illustrates the minimum boxes necessary to the explanation of the present invention, but the HEIF image file 200 may have other boxes in addition to the above-mentioned boxes.

The meta box 202 has an item definition box 203, an item association box 207, an item attribute definition box 211, and an item positional information box 214, as child elements.

In the item definition box 203, items desired to be defined as annotation information are recorded as child elements. In the item definition box 203 in FIG. 2A, a main image item definition 204, a related image item definition 205, and an area item definition 206 are recorded. To define another annotation information, an item desired to be defined is added to the item definition box 203. A definition of an item number of image data 250 (FIG. 2B), which is main image data in the HEIF image file 200, a definition of an item type as "Image", and so forth are recorded in the main image item definition 204. A definition of an item number of related image data 251 (FIG. 2C) cut out from the image data 250, a definition of an item type as "Image", and so forth are recorded in the related image item definition 205. A definition of an item number for an area corresponding to the related image data 251 in the image data 250, for example, an area 253 (FIG. 2D) and a definition of an item type as "Area" are recorded in the area item definition 206.

Item reference information is recorded as child elements in the item association box 207. In FIG. 2A, the relationship between a main image and a related image 208, the relationship between the main image and attribute information on the main image 209, and the relationship between the related image and the attribute information on the related image 210 are recorded in the item association box 207. It should be noted that to define another annotation information, an item desired to be defined is added to the item association box 207. In the relationship between the main image and the related image 208, the item number of the main image data and the item number of the related image data are recorded in association with each other. In the relationship between the main image and the attribute information on the main image 209, the item number of the main image data and attribute information on the main image data 212 (described below) are recorded in association with each other. In the relationship between the related image and attribute information on the related image 210, the item number of the related image data and attribute information on the related image 213 (described below) are recorded in association with each other.

Figure 2D:
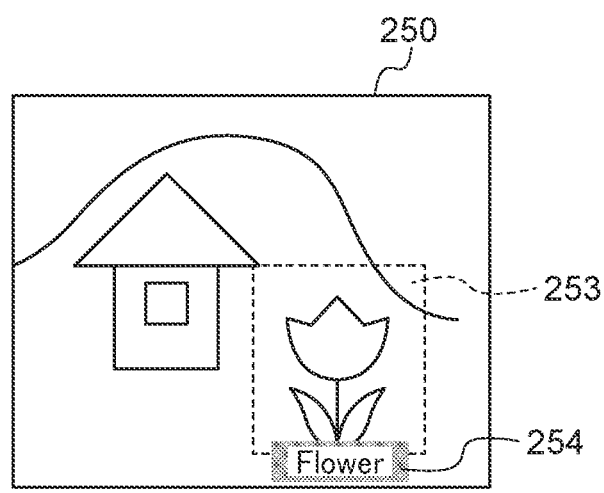

In the item attribute definition box 211, properties such as item attribute information are recorded as child elements. In FIG. 2A, main image attribute information 212 and related image attribute information 213 are recorded in the item attribute definition box 211. It should be noted that to define another annotation information, an item desired to be defined is added to the item attribute definition box 211. Size information, color space information, pixel information, rotational information, and so forth on the main image data are recorded in the main image attribute information 212. Size information, color space information, pixel information, rotational information, and so forth on the related image data are recorded in the related image attribute information 213. The attribute of a detected target is also recorded in the related image attribute information 213. By recording the attribute of the detected target in the related image attribute information 213, for example, as shown in FIG. 2D, a character string 254 "Flower" indicating the attribute of the related image can be displayed in the area 253 corresponding to the related image data.

In the item positional information box 214, positional information on the image data in the mdat box 217 is recorded as child elements. In FIG. 2A, main image positional information 215 and related image positional information 216 are recorded in the item positional information box 214. The positional information on the main image data in the mdat box 217 is recorded in the main image positional information 215. The positional information on the related image data in the mdat box 217 is recorded in the related image positional information 216. Main image data 218 and related image data 219 related to the said main image data 218 are recorded in the mdat box 217. It should be noted that image data in other formats other than HEIF can be recorded in the mdat box 217.

Figure 3:
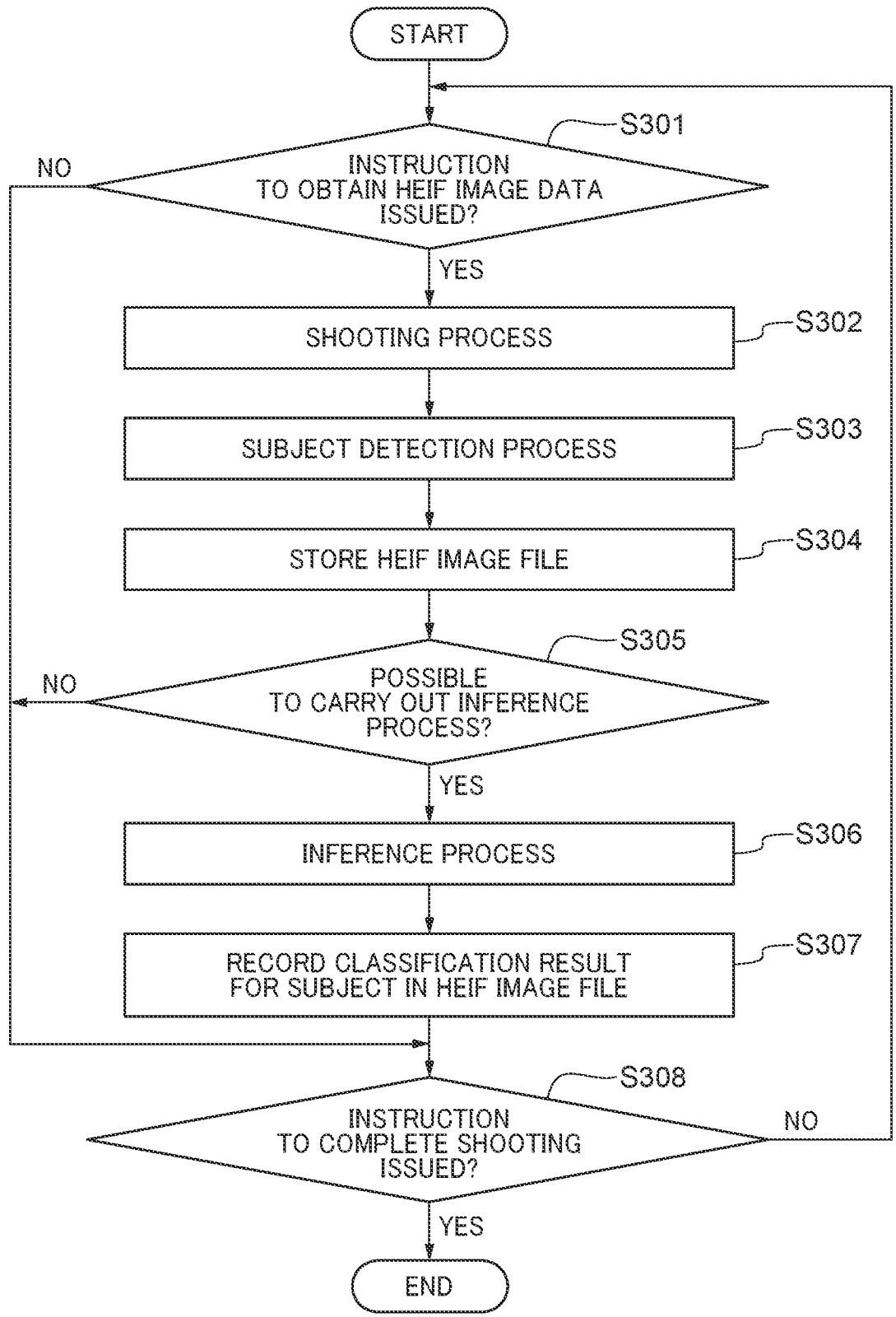
FIG. 3 is a flowchart showing the procedure of a shooting control process that is carried out by the digital camera in FIG. 1.

Shooting performed by the digital camera 100 is now described below. FIG. 3 is a flowchart showing the procedure of a shooting control process that is carried out by the digital camera 100 in FIG. 1. The shooting control process in FIG. 3 is implemented by the system control unit 50A executing a program stored in the nonvolatile memory 51 or the like. The shooting control process in FIG. 3 is carried out when the user has selected the shooting mode with the mode changing switch included in the operating unit 63.

First, the system control unit 50A determines whether or not the user has issued an instruction to obtain HEIF image data by depressing the shutter switch 61 (SW1) or the shutter switch 62 (SW2) (step S301). In a case where it is determined in the step S301 that the user has issued an instruction to obtain HEIF image data, the process proceeds to step S302. In a case where it is determined in the step S301 that the user has not issued an instruction to obtain HEIF image data, the process proceeds to step S308 (described later).

In the step S302, the system control unit 50A carries out a shooting process. In the shooting process, the system control unit 50A performs AF processing and AE processing by controlling the distance measurement control unit 41 and the exposure control unit 40, and stores picture data (still image data, or video data) output from the image pickup device 13 in the memory 25. The system control unit 50A also controls the image processing unit 20 to compress the picture data (still image data, or video data), which is stored in the memory 25, to generate (obtain) HEIF image data.

Next, in step S303, the system control unit 50A controls the image processing unit 20 to carry out a subject detection process on the picture data (still image data, or video data) stored in the memory 25. As a result, a subject area in the picture data (still image data, or video data) is detected.

Then, in step S304, the system control unit 50A stores the HEIF image file 200, which includes the image data generated in the step S302 and information on the subject area detected in the step S303, in the external recording medium 91. The information on the subject area is recorded as information for use in an inference process (described later), in the meta box 202 of the HEIF image file 200, by metadata generating/analyzing unit 70.

After that, in step S305, the system control unit 50A determines whether or not it is possible to carry out the inference process by the inference engine 73A. For example, it is determined that it is not possible to carry out the inference process using the inference engine 73A in a case where at least one of the following two conditions applies: the condition that the inference engine 73A is currently processing another image file, and the condition that the user is currently issuing an instruction to perform continuous shooting by keeping depressing the shutter switch 62. In a case where neither of the above two conditions applies, it is determined that it is possible to carry out the inference process using the inference engine 73A. In a case where it is determined that it is not possible to carry out the inference process using the inference engine 73A, the process proceeds to the step S308 (described later). On the other hand, in a case where it is determined that it is possible to carry out the inference process using the inference engine 73A, the process proceeds to step S306.

In the step S306, the system control unit 50A subjects the HEIF image file 200 to the inference process using the inference engine 73A. The inference engine 73A carries out the inference process for the HEIF image file 200 as an input, using an inference model recorded in the inference model recording unit 72A. In this inference process, subject areas in image data are identified from image data and annotation information included in the HEIF image file 200, and the results of classification for subjects corresponding to the subject areas are output as inference results for each subject area. It should be noted that, information relating to the inference process such as debug information and logs of operations during the inference process can be output as alternatives to the inference results or in addition to the inference results.

Then, in step S307, the system control unit 50A records the classification results for the subjects obtained in the step S306 as annotation information in the HEIF image file 200. It should be noted that in the HEIF image file 200, the results of classification for the subjects, which are output as the inference results from the inference model, have only to be recorded as annotation information. Namely, the results of classification for the subjects can be recorded as they are in the HEIF image file 200, and the results of classification for the subjects (annotation information) can be recorded in any recording format such as text format and binary format. It is easier to manage data in a case where the image data and the results of classification for the subjects is recorded in the HEIF image file 200 in this way, than in a case where data is individually recorded. The system control unit 50A also records the management version of the inference model held in the inference model recording unit 72A, debug information for the inference model, and so forth as inference model management information, in the HEIF image file 200.

Then, in the step S308, the system control unit 50A determines whether or not an instruction to complete shooting has been received from the user. The user is able to issue the instruction to complete shooting by, for example, setting a mode other than the shooting mode with the mode changing switch in the operating unit 63 or by setting the power to OFF with the power button. In a case where it is determined in the step S308 that the instruction to complete shooting has not been received from the user, the process returns to the step S301. In a case where it is determined in the step S308 that the instruction to complete shooting has been received from the user, the present process is ended.

As described above, in the present embodiment, the HEIF image file 200 including image data generated by the digital camera 100 shooting subjects and annotation information such as the results of classification for the subjects is generated.

Moreover, the digital camera 100 according to the present embodiment is also capable of generating a JPEG image file, and for example, is capable of converting the above-mentioned HEIF image file 200 into a JPEG image file.

Figure 4:
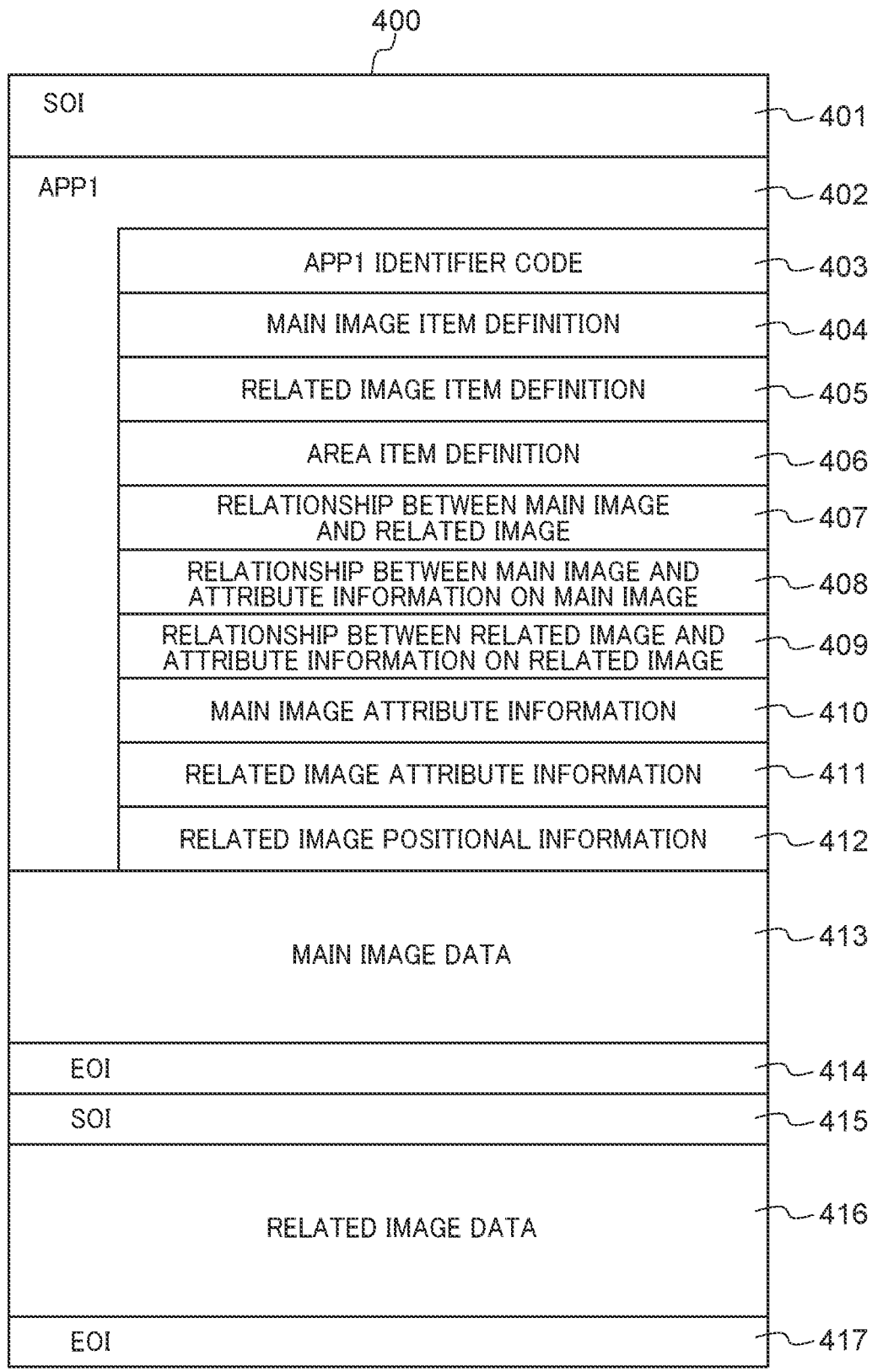
FIG. 4 is a view useful in explaining the configuration of a JPEG image file that is used in the embodiment of the present invention.

FIG. 4 is a view useful in explaining the configuration of a JPEG image file 400 that is used in the embodiment of the present invention. As shown in FIG. 4, in the JPEG image file 400, a marker SOI 401 indicating the start of an image file is recorded at the head of the JPEG image file 400, and an application marker (denoted by "APP1" in FIG. 4) 402 is recorded on a row subsequent to the marker SOI 401.

An APP1 identifier code 403 is recorded in the application marker 402. Typical examples of the APP1 identifier code 403 include Exif. The memory capacity of the application marker 402 is smaller than that of the meta box 202 in the HEIF image file 200. A main image item definition 404, a related image item definition 405, an area item definition 406, the relationship between a main image and a related image 407, and the relationship between the main image and attribute information on the main image 408 are recorded in the application marker 402. The relationship between the related image and the attribute information on the related image 409, main image attribute information 410, related image attribute information 411, and related image positional information 412 are also recorded in the application marker 402.

Information similar to the information in the above-described main image item definition 204 is recorded in the main image item definition 404. Information similar to the information in the above-described related image item definition 205 is recorded in the related image item definition 405. Information similar to the information in the above-described area item definition 206 is recorded in the area item definition 406. Information similar to the information in the above-described relationship between the main image and the related image 208 is recorded in the relationship between the main image and the related image 407. Information similar to the information in the above-described relationship between the main image and the attribute information on the main image 209 is recorded in the relationship between the main image and the attribute information on the main image 408. Information similar to the information in the above-described relationship between the related image and the attribute information on the related image 210 is recorded in the relationship between the related image and the attribute information on the related image 409. Information similar to the information in the above-described main image attribute information 212 is recorded in the main image attribute information 410. Information similar to the information in the above-described related image attribute information 213 is recorded in the related image attribute information 411. The size of related image data 416 (described later), and the location of a marker SOI 415 indicating the start of the related image data 416 are recorded in the related image positional information 412.

Main image data 413 is recorded in a row subsequent to the related image positional information 412. The main image data 413 is main image data in the JPEG image file 400. A marker EOI 414 indicating the end of main image data is recorded in a row subsequent to the main image data 413. A marker SOI 415 indicating the start of related image data, and the related image data 416, are recorded in this order in rows subsequent to the marker EOI 414. A marker EOI 417 indicating the end of related image data is recorded on a row subsequent to the related image data 416.

Here, the JPEG image file 400 has a smaller memory capacity (the size of an area where data can be recorded) of an area where annotation information is recorded (the application marker 402) as compared to image files in other formats such as HEIF. For this reason, in a case where an HEIF image file or the like is converted to a JPEG image file, annotation information recorded in a pre-conversion image file cannot be recorded as it is in the JPEG image file, and hence an image file cannot be efficiently converted.

On the other hand, in the present embodiment, annotation information for JPEG, which fits in a size that can be recorded in the application marker 402 in the JPEG image file 400 is recorded in advance in an HEIF image file.

Figure 5:
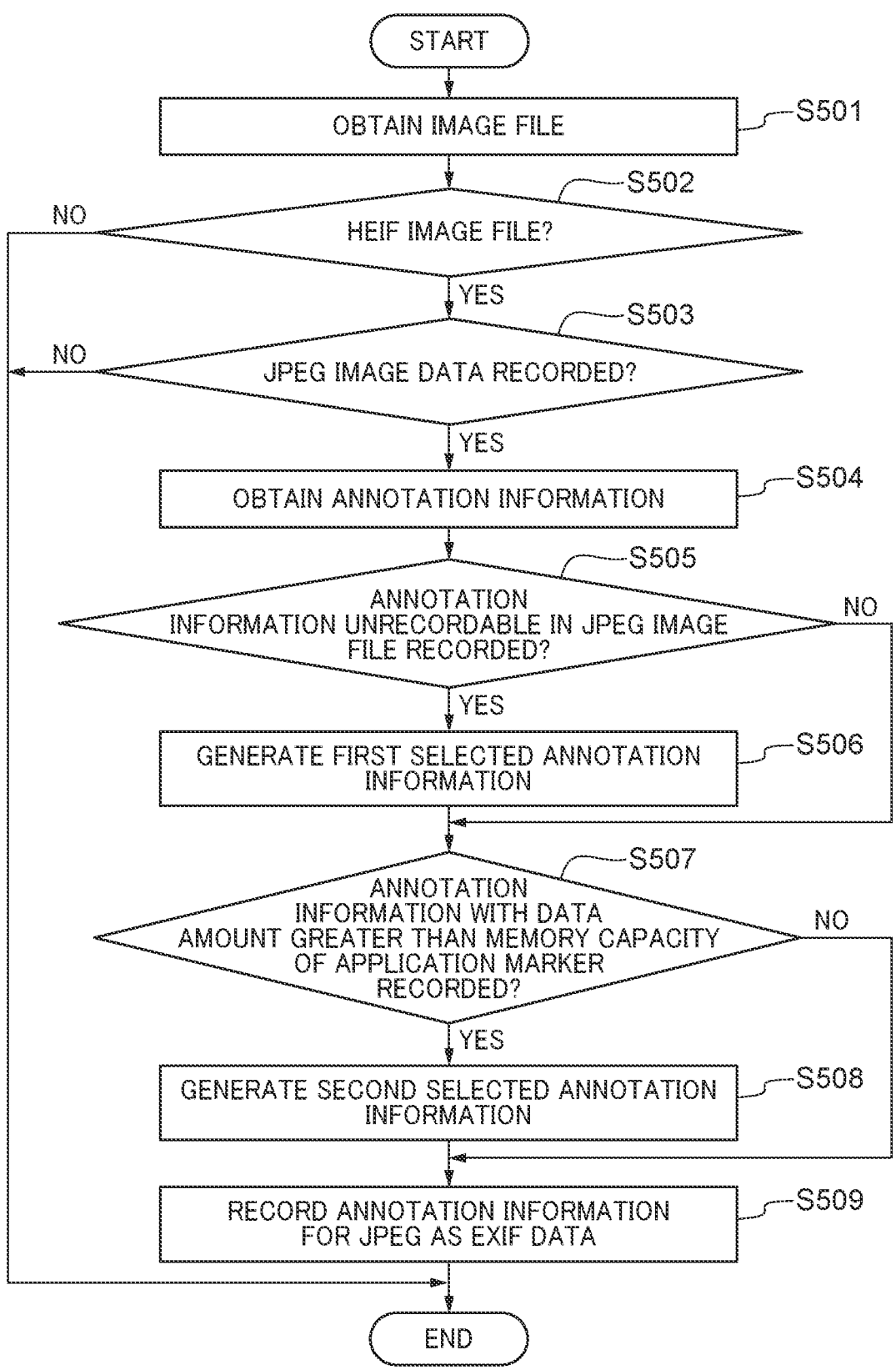
FIG. 5 is a flowchart showing the procedure of a recording process of annotation information for JPEG, which is carried out in the digital camera in FIG. 1.

FIG. 5 is a flowchart showing the procedure of a recording process of annotation information for JPEG, which is carried out in the digital camera 100 in FIG. 1. The recording process of annotation information for JPEG in FIG. 5 is implemented by the system control unit 50A executing a program stored in the nonvolatile memory 51 or the like. For example, in a case where an in-shooting automatic generating function for generating annotation information for JPEG at the time of shooting is enabled, the recording process of annotation information for JPEG in FIG. 5 is carried out subsequently to the shooting control process in FIG. 3 described above. Alternatively, the recording process of annotation information for JPEG in FIG. 5 is carried out when an instruction to generate annotation information for JPEG in at least one image file selected by the user from a plurality of image files stored in the external recording medium 91 has been received via the operating unit 63. It should be noted that in a case where there is a plurality of image files to be processed, the recording process of annotation information for JPEG is carried out for all of the image files to be processed. Referring to FIG. 5, a description will be given of an example in which the user has selected one image file and issued an instruction to generate annotation information for JPEG in the image file.

Referring to FIG. 5, first, in step S501, the system control unit 50A obtains an image file to be processed from the external recording medium 91. Next, in step S502, the system control unit 50A determines whether or not the image file obtained in the step S501 is an HEIF image file. In a case where it is determined in the step S502 that the image file obtained in the step S501 is not an HEIF image file, the present process is ended. In a case where it is determined in the step S502 that the image file obtained in the step S501 is an HEIF image file, the process proceeds to step S503.

In the step S503, the system control unit 50A determines whether or not JPEG image data is recorded in the image file obtained in the step S501. In a case where it is determined in the step S503 that JPEG image data is recorded in the image file obtained in the step S501, the process proceeds to step S504. In a case where it is determined in the step S503 that JPEG image data is not recorded in the image file obtained in the step S501, the present process is ended.

In the step S504, the system control unit 50A obtains annotation information from the image file obtained in the step S501. Specifically, the system control unit 50A obtains the information recorded in the meta box 202 and the related image data 219 from the image file obtained in the step S501.

Then, in step S505, the system control unit 50A determines whether or not annotation information that cannot be recorded in a JPEG image file is recorded in the image file obtained in the step S501. Examples of the annotation information that cannot be recorded in a JPEG image file include audio data and video data that are not allowed to be recorded in image files according to the JPEG standard. In a case where it is determined in the step S505 that the annotation information that cannot be recorded in a JPEG image file is recorded in the image file obtained in the step S501, the process proceeds to step S506. In a case where it is determined in the step S505 that annotation information that cannot be recorded in a JPEG image file is not recorded in the image file obtained in the step S501, the process proceeds to step S507.

In the step S506, the system control unit 50A generates first selected annotation information. The first selected annotation information is annotation information obtained by the annotation information that cannot be recorded in a JPEG image file being excluded from the annotation information obtained in the step S504.

Then, in the step S507, the system control unit 50A determines whether or not annotation information whose data amount is greater than the memory capacity of the application marker 402 in the JPEG image file is recorded in the image file obtained in the step S501. The annotation information whose data amount is greater than the memory capacity of the application marker 402 is, for example, the related image data 219.

In a case where it is determined in the step S507 that the annotation information whose data amount is greater than the memory capacity of the application marker 402 is recorded in the image file obtained in the step S501, the process proceeds to step S508. In a case where it is determined in the step S507 that the annotation information whose data amount is greater than the memory capacity of the application marker 402 is not recorded in the image file obtained in the step S501, the process proceeds to step S509.

In the step S508, the system control unit 50A generates second selected annotation information. The second selected annotation information is annotation information obtained by the annotation information whose data amount is greater than the memory capacity of the application marker 402 being excluded from annotation information to be processed. The annotation information to be processed is the annotation information obtained in the step S504 or the first selected annotation information.

Figure 6:
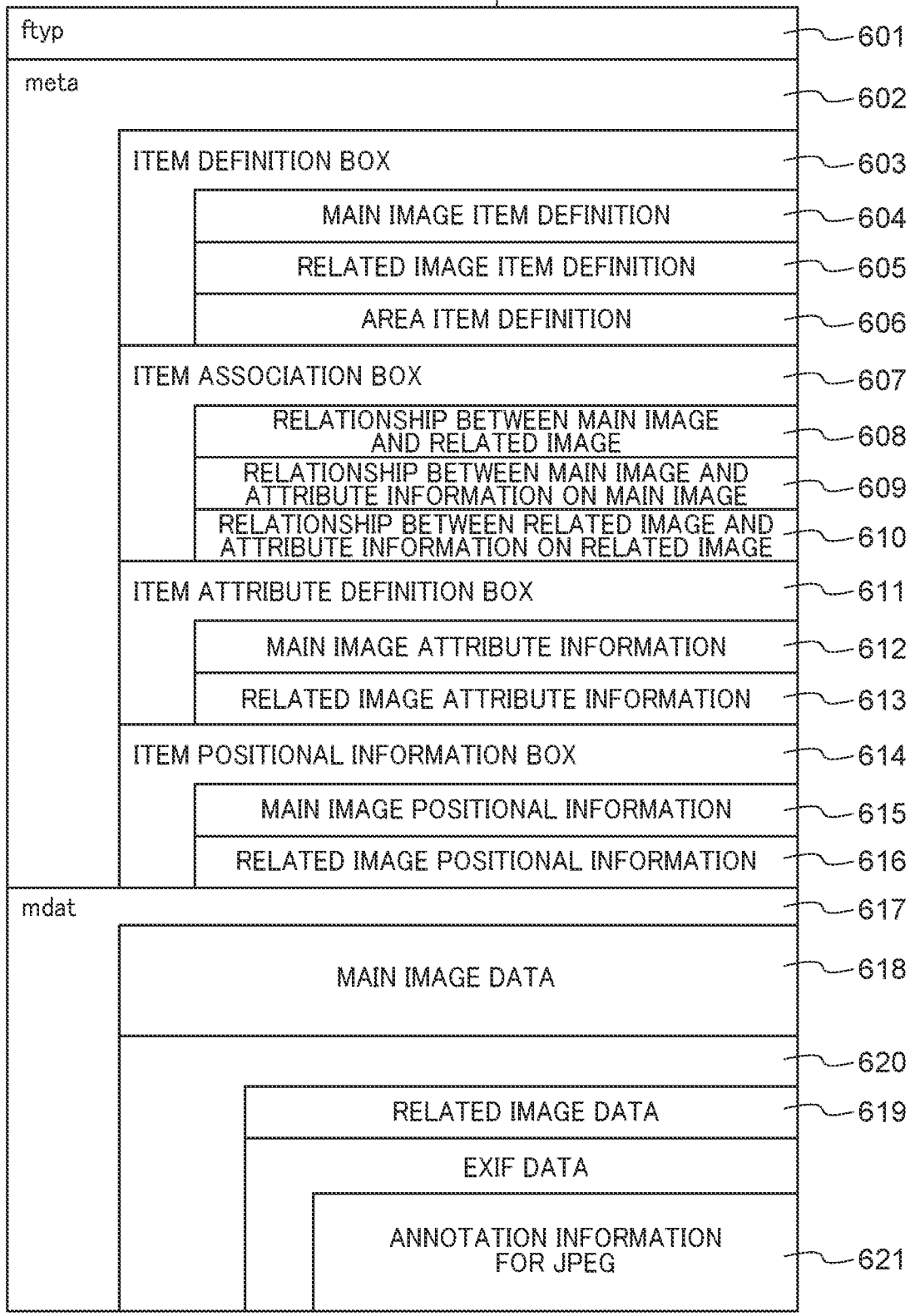
FIG. 6 is a view showing an example of an HEIF image file that is generated by the digital camera in FIG. 1.

Then, in the step S509, the system control unit 50A records annotation information for JPEG as Exif data for the above-mentioned JPEG image data into the image file obtained in the step S501. Specifically, the system control unit generates an image file obtained by including the above-mentioned JPEG image data in the image file obtained in the step S501 and records the annotation information for JPEG in an application marker in the said image file. For example, in a case where related image data included in the image file obtained in the step S501 is JPEG image data, an image file 620 including related image data 619 is generated as shown by an HEIF image file 600 in FIG. 6. Annotation information for JPEG 621 is recorded in an application marker in an image file 620. It should be noted that the configurations other than the image file 620 in the HEIF image file 600 in FIG. 6 are the same as those of the HEIF image file 200 in FIG. 2A described above.

Here, for example, in a case where neither annotation information that cannot be recorded in a JPEG image file nor annotation information whose data amount is greater than the memory capacity of the application marker 402 is recorded in the image file obtained in the step S501 (NO in both of the steps S505 and S507), the annotation information obtained in the step S504 is recorded as the annotation information for JPEG.

In a case where annotation information that cannot be recorded in a JPEG image file is recorded in the image file obtained in the step S501 while annotation information whose data amount is greater than the memory capacity of the application marker 402 is not recorded in the image file obtained in the step S501 (YES in the step S505, NO in the step S507), the first selected annotation information is recorded as the annotation information for JPEG.

In a case where at least annotation information whose data amount is greater than the memory capacity of the application marker 402 is recorded in the image file obtained in the step S501 (YES in the step S507), the second selected annotation information is recorded as the annotation information for JPEG. When the process in the step S509 is completed, the present process is ended.

Figure 7:
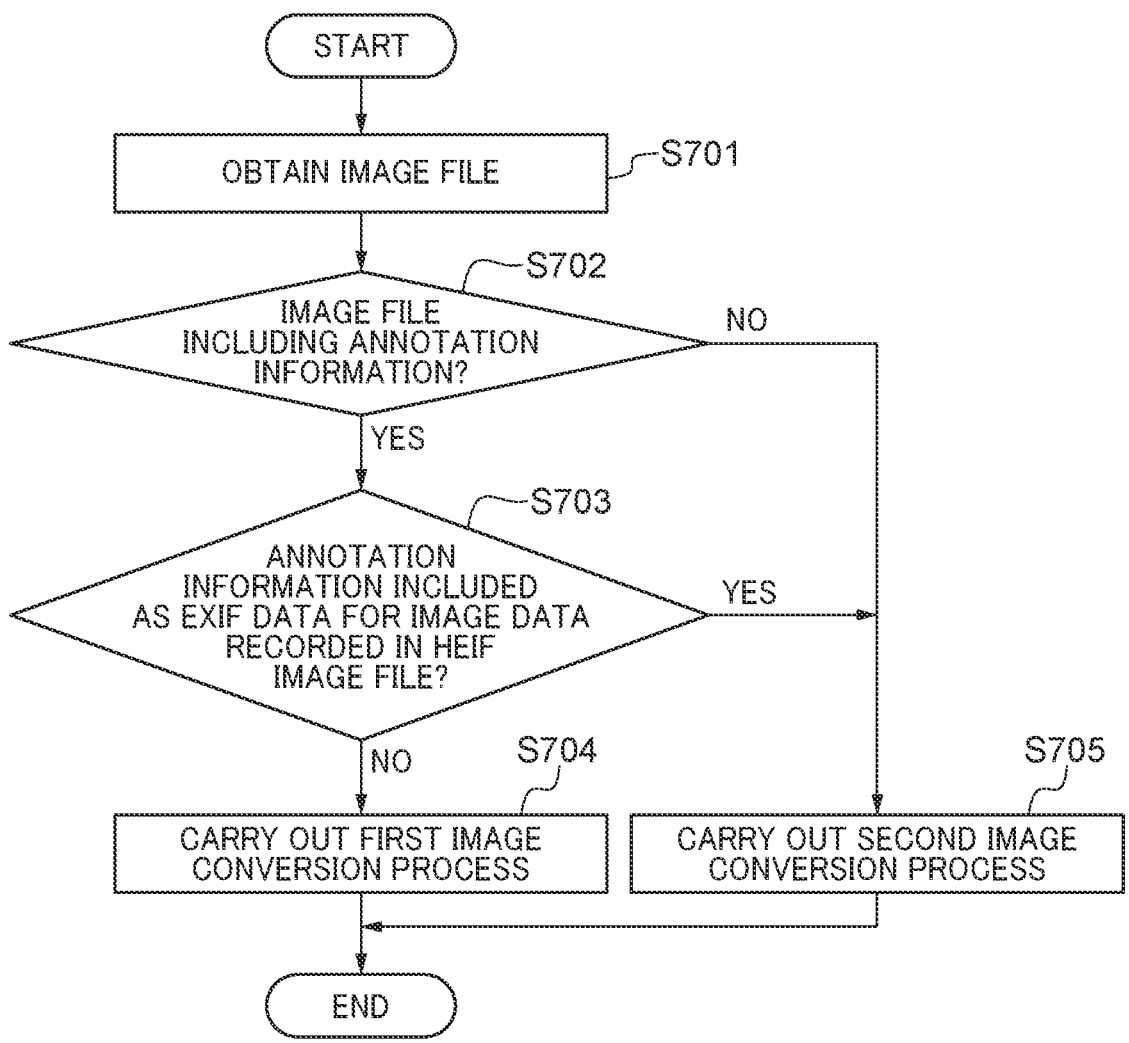
FIG. 7 is a flowchart showing a procedure of an image conversion process that is carried out in the digital camera in FIG. 1.

A description will now be given of how an image file is converted by the digital camera 100. FIG. 7 is a flowchart showing a procedure of an image conversion process that is carried out in the digital camera 100 in FIG. 1. The image conversion process in FIG. 7 is implemented by the system control unit executing a program stored in the nonvolatile memory 51 or the like. The image conversion process in FIG. 7 is carried out when the digital camera 100 has received an instruction to perform image conversion (image conversion instruction), by a user via the operating unit 63. It should be noted that the user selects at least one image file to be processed from a plurality of image files stored in the external recording medium 91, to issue the image conversion instruction. Referring to FIG. 7, a description will be given of an example in which the user has selected one image file and issued an image conversion instruction.

First, in step S701, the system control unit 50A obtains an image file selected by the user from the plurality of image files stored in the external recording medium 91 of the digital camera 100.

Next, in step S702, the system control unit 50A determines whether or not the image file obtained in the step S701 includes annotation information. In a case where it is determined in the step S702 that the image file obtained in the step S701 includes annotation information, the process proceeds to step S703. In a case where it is determined in the step S702 that the image file obtained in the step S701 does not include annotation information, the process proceeds to step S705 described later.

In the step S703, the system control unit 50A determines whether or not the image file obtained in the step S701 is an image file including the annotation information as Exif data for image data recorded in an HEIF image file. In a case where it is determined in the step S703 that the image file obtained in the step S701 is not an image file including the annotation information as Exif data for image data recorded in an HEIF image file, the process proceeds to step S704. In a case where it is determined in the step S703 that the image file obtained in the step S701 is an image file including the annotation information as Exif data for image data recorded in an HEIF image file, the process proceeds to the step S705.

In the step S704, the system control unit 50A carries out a first image conversion process on the image file obtained in the step S701. In the first image conversion process, the system control unit 50A carries out a process to generate, based on the annotation information included in the image file obtained in the step S701, annotation information to be recorded in the JPEG image file 400. For example, the system control unit 50A records the main image data 218 and the related image data 219 in the HEIF image file 200 obtained in the step S701, into an area other than the application marker 402 in the JPEG image file 400. The system control unit 50A also records the generated annotation information in the application marker 402 in the JPEG image file 400. After that, the present process is ended.

In the step S705, the system control unit 50A carries out a second image conversion process on the image file obtained in the step S701. In the second image conversion process, the system control unit 50A does not carry out the process for generating annotation information to be recorded in the JPEG image file 400. For example, the system control unit 50A records the main image data 618 and the related image data 619 in the HEIF image file 600 obtained in the step S701, into an area other than the application marker 402 in the JPEG image file 400. The system control unit 50A thus records the related image data 619, which is not included in the annotation information for JPEG, in the JPEG image file 400. The system control unit 50A also records the annotation information 621 for JPEG, which is recorded as Exif data in the HEIF image file 600, as it is into the application marker 402 in the JPEG image file 400. After that, the present process is ended.

According to the embodiment described above, in the image processing apparatus that converts an HEIF image file to a JPEG image file in accordance with an image conversion instruction from the user, the annotation information 621 for JPEG is recorded in the HEIF image file 600 before the image processing apparatus receives the image conversion instruction. In conversion from the HEIF image file 600 into the JPEG image file 400, the annotation information 621 for JPEG recorded in the HEIF image file 600 is recorded in the application marker 402 in the JPEG image file 400. As a result, in the conversion from the HEIF image file 600 to the JPEG image file 400, the annotation information 621 for JPEG recorded in the pre-conversion image file can be recorded as it is into the JPEG image file 400. Thus, an image file can be efficiently converted.

Moreover, in the embodiment described above, in the case where JPEG image data is included in the HEIF image file 600, the image file 620 including the related image data 619, which is the JPEG image data, is generated in the HEIF image file 600. The annotation information 621 for JPEG is recorded in in the application marker in the image file 620. As a result, in conversion from the HEIF image file 600 to the JPEG image file 400, the annotation information 621 for JPEG that can be recorded as it is in the JPEG image file 400 is easily obtained from the image file 620.

In the embodiment described above, the annotation information 621 for JPEG does not include annotation information of the type that cannot be recorded in the JPEG image file 400, out of annotation information included in the HEIF image file 600. As a result, a cause of a conversion error, that is, annotation information of the type that cannot be recorded in the JPEG image file 400, is prevented from being recorded in the JPEG image file 400.

In the embodiment described above, the annotation information 621 for JPEG does not include annotation information whose data amount is greater than the memory capacity of the application marker 402, out of annotation information included in the HEIF image file 600. As a result, a cause of a conversion error, that is, annotation information whose data amount is greater than the memory capacity of the application marker 402, is prevented from being recorded in the JPEG image file.

In the embodiment described above, the image processing apparatus is an image pickup apparatus that shoots a subject and generates the main image data 618 included in the HEIF image file 600. According to the embodiment described above, in the image pickup apparatus that converts the HEIF image file 600 including the main image data 618 obtained by shooting into the JPEG image file 400, an image file is effectively converted.

Although the present invention has been described by way of the embodiment above, the present invention should not be limited to the embodiment described above. For example, the annotation information for JPEG can be recorded in the meta box 202 in the HEIF image file.

Figure 8:
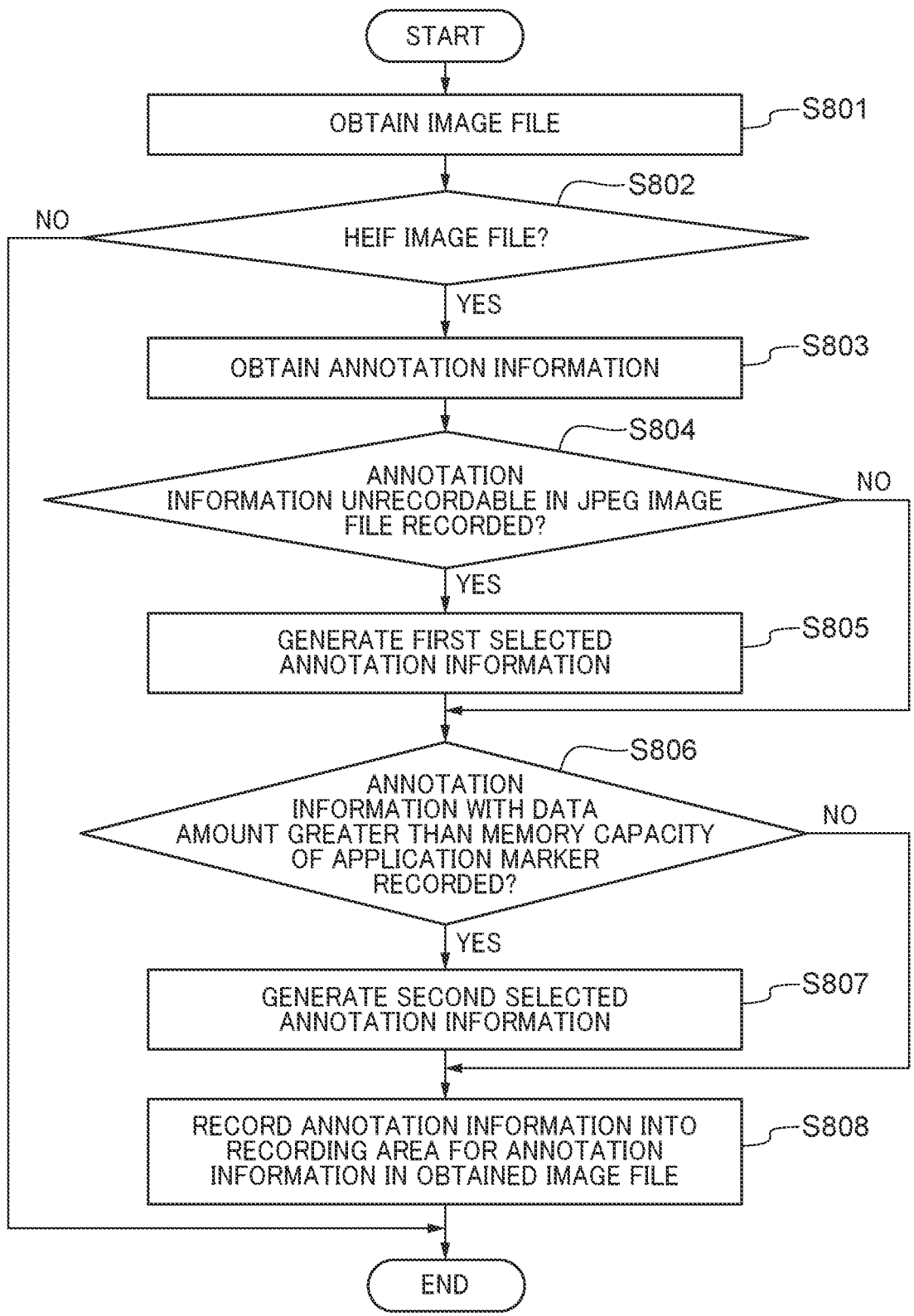
FIG. 8 is a flowchart showing another procedure of the recording process of annotation information for JPEG in FIG. 5.

FIG. 8 is a flowchart showing another procedure of the recording process of annotation information for JPEG in FIG. 5. The recording process of annotation information for JPEG in FIG. 8 is similar to the recording process of annotation information for JPEG in FIG. 5, and a description will be given below particularly of features different from those of the recording process of annotation information for JPEG in FIG. 5. As with the recording process of annotation information for JPEG in FIG. 5, the recording process of annotation information for JPEG in FIG. 8 is implemented by the system control unit 50A executing a program stored in the nonvolatile memory 51 or the like. For example, the recording process of annotation information for JPEG in FIG. 8 is also carried out subsequently to the shooting control process in FIG. 3 described above in a case where an in-shooting automatic generating function for generating annotation information for JPEG at the time of shooting is enabled. Alternatively, the recording process of annotation information for JPEG in FIG. 8 is carried out when an instruction to generate annotation information for JPEG in one or more image files selected by the user from a plurality of image files stored in the external recording medium 91 has been received via the operating unit 63. Referring to FIG. 8, a description will be given of an example in which the user has selected one image file and issued an instruction to generate annotation information for JPEG in the image file.

Referring to FIG. 8, processes in steps S801 and S802 which are similar to the processes in the S501 and S502 described above are carried out. In a case where it is determined in the step S802 that an image file obtained in the step S801 is not an HEIF image file, the present process is ended. In a case where it is determined in the step S802 that the image file obtained in the step S801 is an HEIF image file, the process proceeds to step S803 which is similar to the process in the S504 described above. Then, processes in steps S804 to S807 which are similar to the processes in the steps S505 to S508 described above are carried out.

Figure 9:
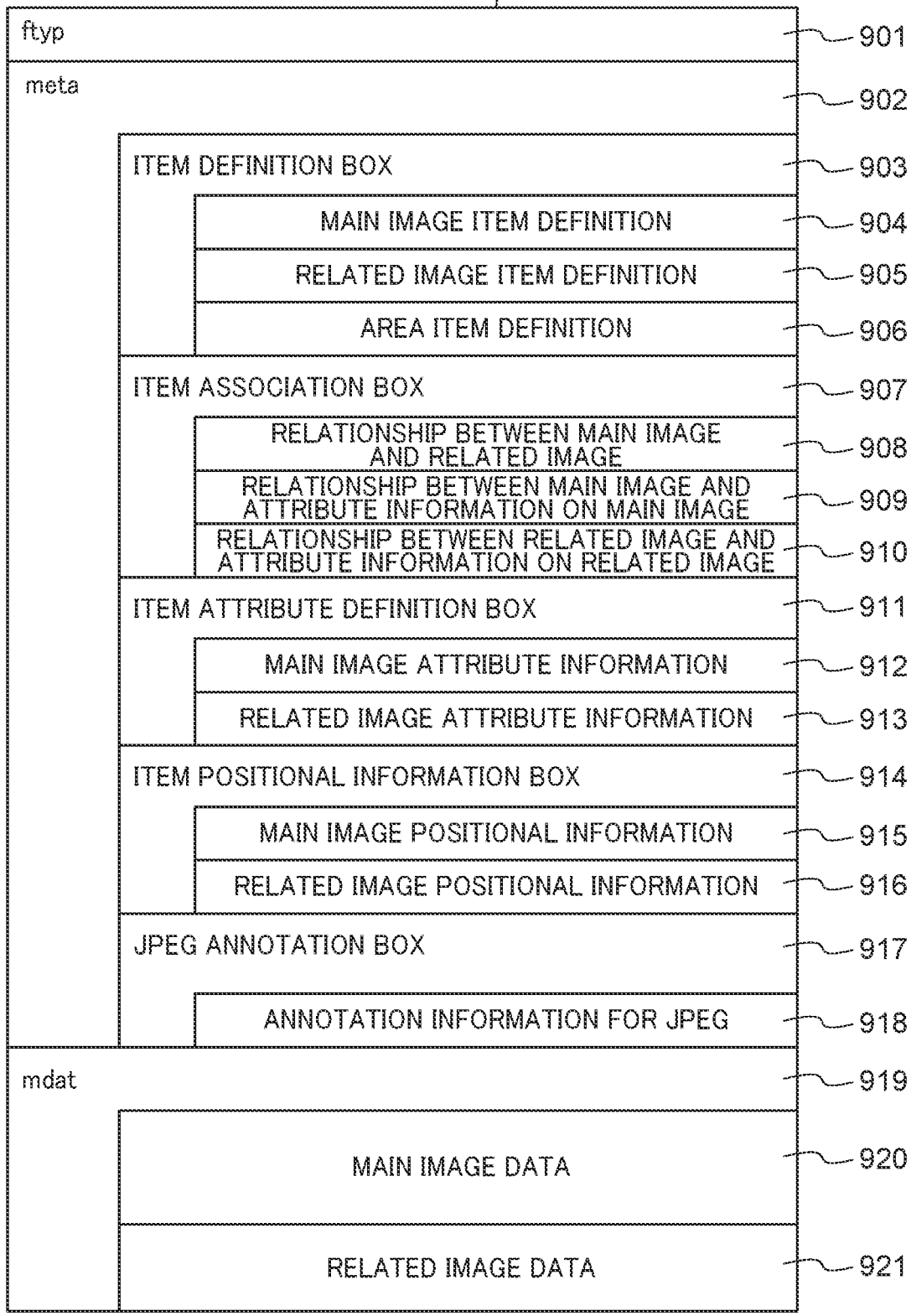
FIG. 9 is a view showing an example of an HEIF image file that is generated by the digital camera in FIG. 1.

After that, in step S808, the system control unit 50A records annotation information for JPEG into a recording area for annotation information in the image file obtained in the step S801. For example, the system control unit 50A records a box 917 into a meta box 902 in an HEIF image file 900 in FIG. 9 obtained in the step S801. Annotation information 918 for JPEG is recorded in the box 917. It should be noted that the configuration of the HEIF image file 900 in FIG. 9 except for the box 917 is similar to that of the HEIF image file 200 in FIG. 2A described above. After that, the present process is ended.

Figure 10:
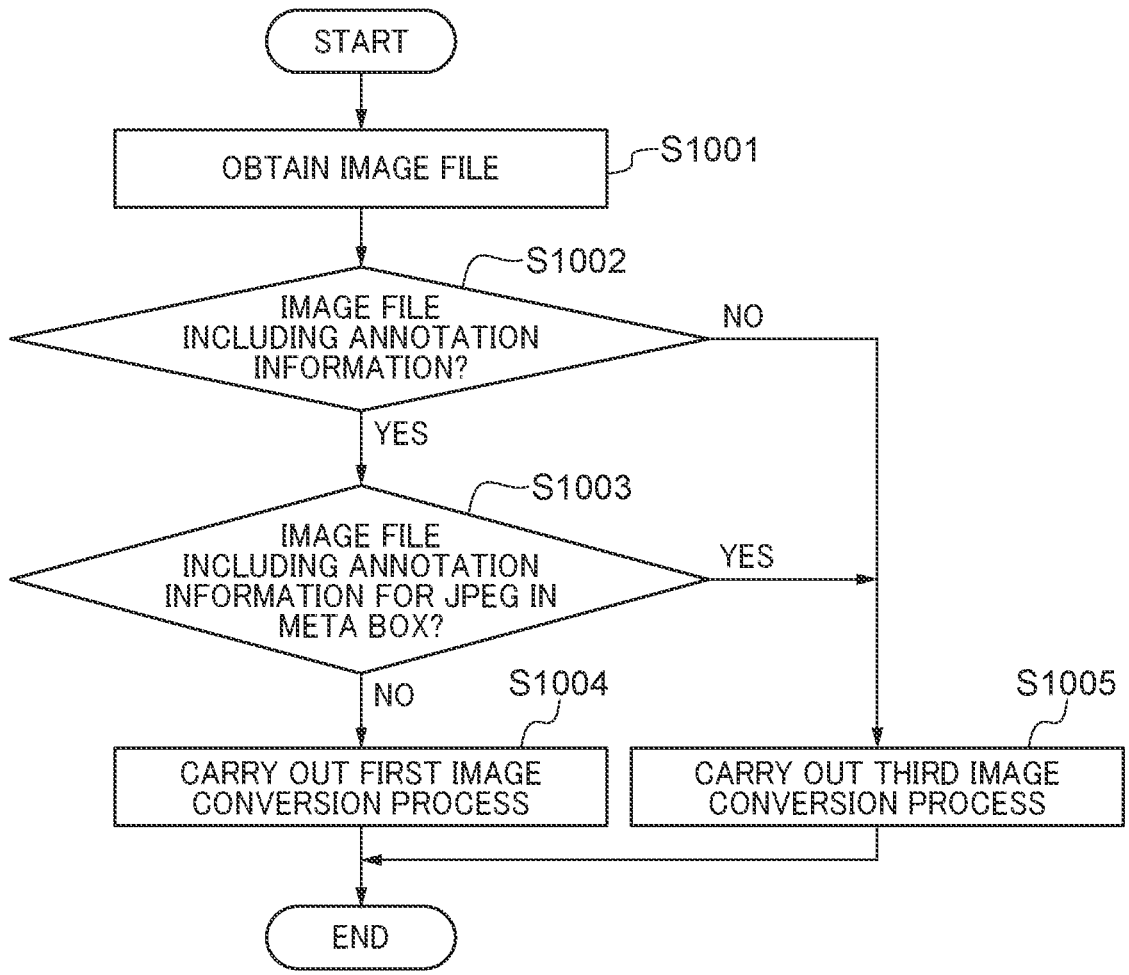
FIG. 10 is a flowchart showing another procedure of the image conversion process in FIG. 7.

FIG. 10 is a flowchart showing another procedure of the image conversion process in FIG. 7. The image conversion process in FIG. 10 is similar to the image conversion process in FIG. 7, and a description will be given below particularly of features different from those of the image conversion process in FIG. 7. As with the image conversion process in FIG. 7, the image conversion process in FIG. 10 is implemented by the system control unit 50A executing a program stored in the nonvolatile memory 51 or the like. The image conversion process in FIG. 10 is also carried out when the digital camera 100 has received image conversion instruction, by a user via the operating unit 63. It should be noted that the user selects at least one image file to be processed from a plurality of image files stored in the external recording medium 91, to issue the image conversion instruction. Referring to FIG. 10, a description will be given of an example in which the user has selected one image file and issued an image conversion instruction.

Referring to FIG. 10, processes in steps S1001 and S1002 which are similar to the processes in the S701 and S702 described above are carried out. In a case where it is determined in the step S1002 that an image file obtained in the step S1001 includes annotation information, the process proceeds to step S1003. In a case where it is determined in the step S1002 that an image file obtained in the step S1001 does not include annotation information, the process proceeds to step S1005 described later.

In the step S1003, the system control unit 50A determines whether or not the image file obtained in the step S1001 is an image file including annotation information for JPEG in a meta box in an HEIF image file. In a case where it is determined in the step S1003 that the image file obtained in the step S1001 is not image file including the annotation information for JPEG in the meta box in the HEIF image file, the process proceeds to step S1004. The process in the step S1004 is similar to the step S704 described above. In a case where it is determined in the step S1003 that the image file obtained in the step S1001 is an image file including the annotation information for JPEG in the meta box in the HEIF image file, the proceeds to step S1005.

In the step S1005, the system control unit 50A carries out a third image conversion process on the image file obtained in the step S1001. In the third image conversion process, as with the second image conversion process, the system control unit 50A does not carry out a process for generating annotation information to be recorded in the JPEG image file 400. For example, the system control unit 50A records main image data 920 and related image data 921 in the HEIF image file 900 obtained in the step S1001, into an area other than the application marker 402 in the JPEG image file 400. The system control unit 50A also records the annotation information 918 for JPEG, which is recorded in the meta box 902 in the HEIF image file 900, as it is into the application marker 402 in the JPEG image file 400. After that, the present process is ended.

In the embodiment described above, the annotation information 918 for JPEG is recorded in the meta box 902 in the HEIF image file 900. Thus, in conversion from the HEIF image file 900 to the JPEG image file 400, the annotation information 918 for JPEG that can be recorded as it is in the JPEG image file 400 is easily obtained from the meta box 902.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-086766, filed May 27, 2022, which is hereby incorporated by reference wherein in its entirety.

What is claimed is:

1. An image processing apparatus comprising:
at least one memory that stores a set of instructions; and
at least one processor that is configured to execute the instructions, wherein the instructions, when being executed, cause the image processing apparatus to:
(1) in accordance with an image conversion instruction issued by a user, convert a first-format image file in a first format including (i) image data and (ii) annotation information on the image data into a second-format image file in a second format whose memory capacity of a predetermined area where annotation information is recordable is limited to a first size, wherein a memory capacity of a predetermined area in the first-format image file where annotation information is recordable is greater than the first size;
(2) when recording the first-format image file before the image processing apparatus receives the image conversion instruction, perform operations to: (i) generate first annotation information for the first-format image file, (ii) generate second annotation information for the second-format image file, including information obtained by removing a part of data of the first annotation information so that a data amount of the second annotation information is not greater than the first size, and (iii) record the image data, the first annotation information for the first-format image file, and the second annotation information for the second-format image file in the first-format image file,
wherein in the converting the first first-format image file into the second first-format image file in accordance with the image conversion instruction, the second-format image file is generated from the image data and the second annotation information for the second-format image file both recorded in the first-format image file, and
wherein the second annotation information is recorded in the predetermined area in the second-format image file.

2. The image processing apparatus according to claim 1, wherein the at least one processor executes an instruction causing the image processing apparatus to:
in a case where the first-format image file includes image data in a format that is recordable in the second-format image file, generate the second annotation information and record the generated second annotation information in the first-format image file, and
in a case where the first-format image file does not include image data in the format that is recordable in the second-format image file, not generate the second annotation information and not record the second annotation information in the first-format image file.

3. The image processing apparatus according to claim 1, wherein the at least one processor executes an instruction causing the image processing apparatus to record the second annotation information in a specific area in the first-format image file.

4. The image processing apparatus according to claim 1, wherein the second annotation information does not include a piece or pieces of annotation information of a type that is unrecordable in the second-format image file among pieces of the first annotation information, and
wherein the at least one processor executes an instruction causing the image processing apparatus to (i) generate third annotation information by removing a piece or pieces of annotation information of a type that is unrecordable in the second-format image file from the first annotation information, and (ii) generate the second annotation information by removing a part of data of the third annotation information so that the data amount of the second annotation information is not greater than the first size.

5. The image processing apparatus according to claim 1, wherein the image processing apparatus is an image pickup apparatus configured to shoot a subject and generate image data to be included in the first-format image file.

6. The image processing apparatus according to claim 1, wherein the first format is High Efficiency Image File Format (HEIF), and the second format is JPEG.

7. The image processing apparatus according to claim 1, wherein the at least one processor executes an instruction causing the image processing apparatus to record, among pieces of the first annotation information recorded in the first-format image file, related image data related to the image data in another area in the second-format image file, the another area being different from the predetermined area.

8. A control method for an image processing apparatus, the control method comprising:
in accordance with an image conversion instruction issued by a user, converting a first-format image file in a first format including image data and annotation information on the image data into a second-format image file in a second format whose memory capacity of a predetermined area where annotation information is recordable is limited to a first size, wherein a memory capacity of a predetermined area in the first-format image file where annotation information is recordable is greater than the first size; and when recording the first-format image file before the image processing apparatus receives the image conversion instruction, perform operations to: (i) generate first annotation information for the first-format image file, (ii) generate second annotation information for the second-format image file, including information obtained by removing a part of data of the first annotation information so that a data amount of the second annotation information is not greater than the first size, and (iii) record the image data, the first annotation information for the first-format image file, and the second annotation information for the second-format image file in the first-format image file, wherein in the converting the first first-format image file into the second first-format image file in accordance with the image conversion instruction, the second-format image file is generated from the image data and the second annotation information for the second-format image file both recorded in the first-format image file, and wherein the second annotation information is recorded in the predetermined area in the second-format image file.

9. A non-transitory storage medium storing a computer-executable program for causing a control method for an image processing apparatus, the control method comprising: in accordance with an image conversion instruction issued by a user, converting a first-format image file in a first format including image data and annotation information on the image data into a second-format image file in a second format whose memory capacity of a predetermined area where annotation information is recordable is limited to a first size, wherein a memory capacity of a predetermined area in the first-format image file where annotation information is recordable is greater than the first size; and when recording the first-format image file before the image processing apparatus receives the image conversion instruction, perform operations to: (i) generate first annotation information for the first-format image file, (ii) generate second annotation information for the second-format image file, including information obtained by removing a part of data of the first annotation information so that a data amount of the second annotation information is not greater than the first size, and (iii) record the image data, the first annotation information for the first-format image file, and the second annotation information for the second-format image file in the first-format image file, wherein in the converting the first first-format image file into the second first-format image file in accordance with the image conversion instruction, the second-format image file is generated from the image data and the second annotation information for the second-format image file both recorded in the first-format image file, and wherein the second annotation information is recorded in the predetermined area in the second-format image file.

* * * * *